July 15, 1941.　　　　L. S. WILLIAMS　　　　2,249,369
WEIGHING SCALE
Filed Dec. 2, 1936　　　　3 Sheets-Sheet 1
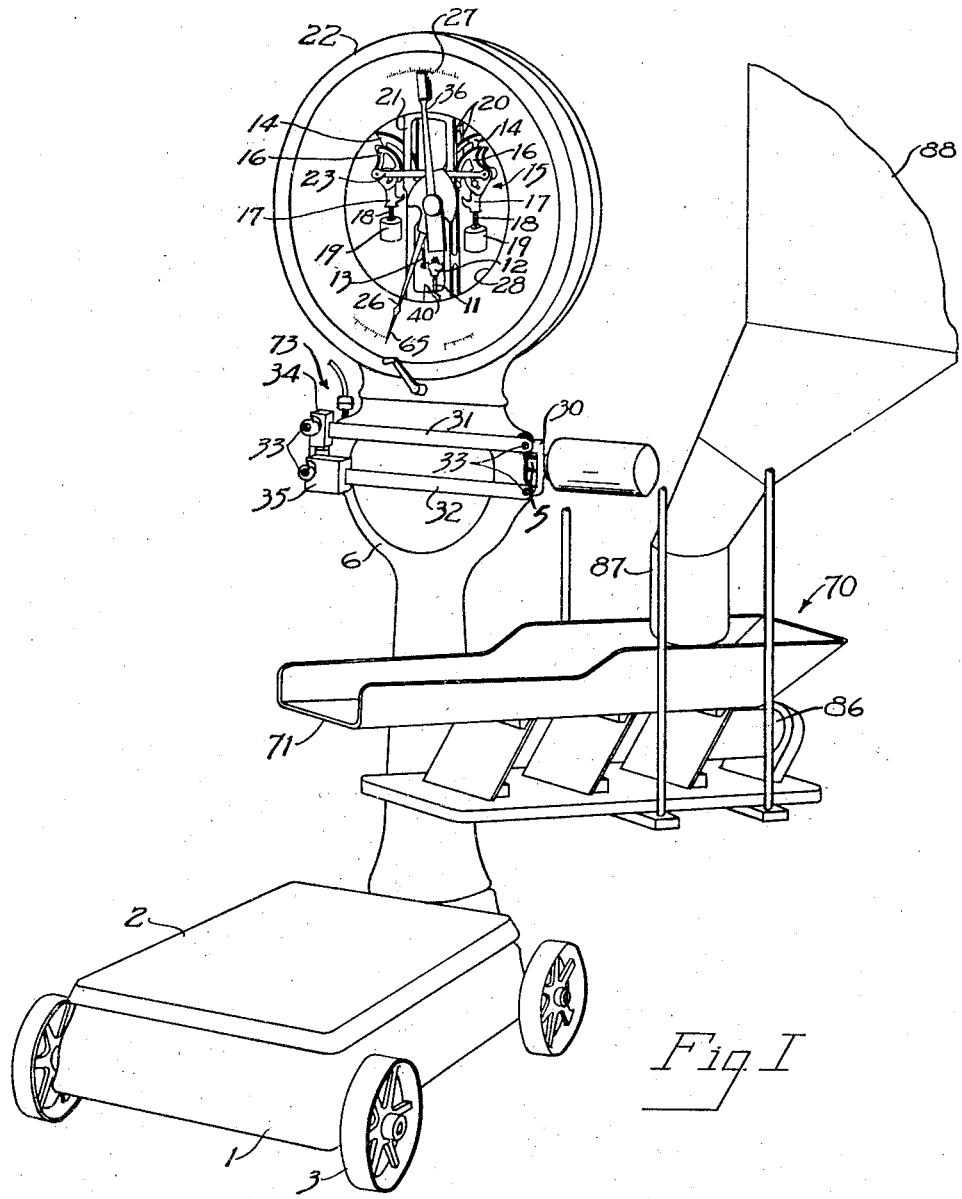
Fig. I
Lawrence S. Williams
INVENTOR
BY
ATTORNEY

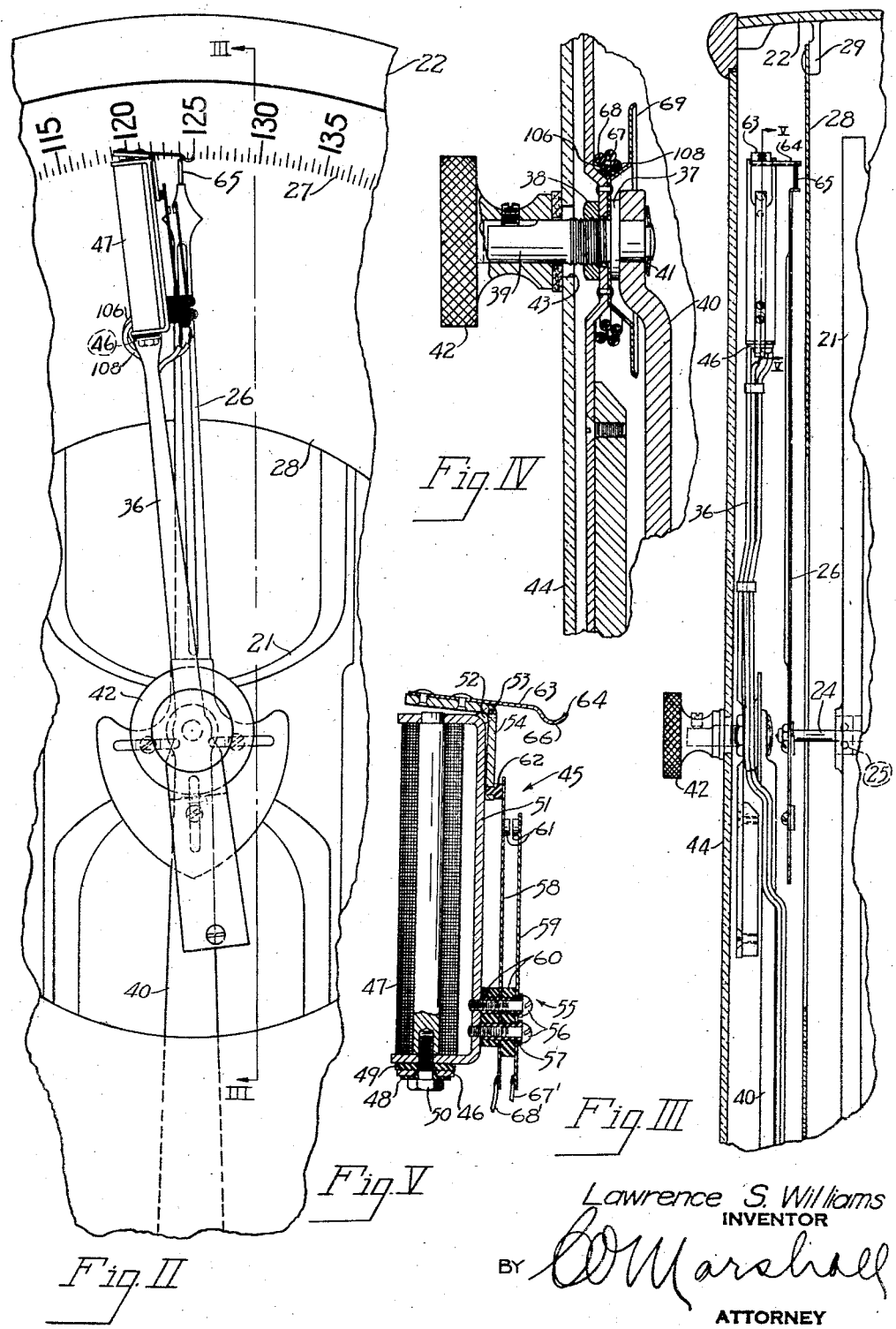

July 15, 1941.    L. S. WILLIAMS    2,249,369
WEIGHING SCALE
Filed Dec. 2, 1936    3 Sheets-Sheet 3
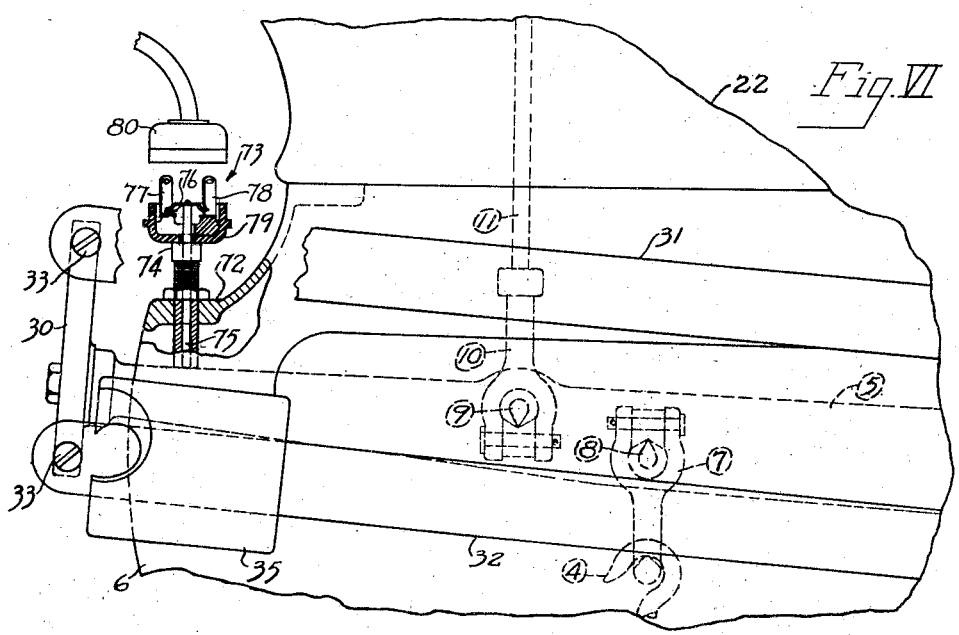
Fig. VI
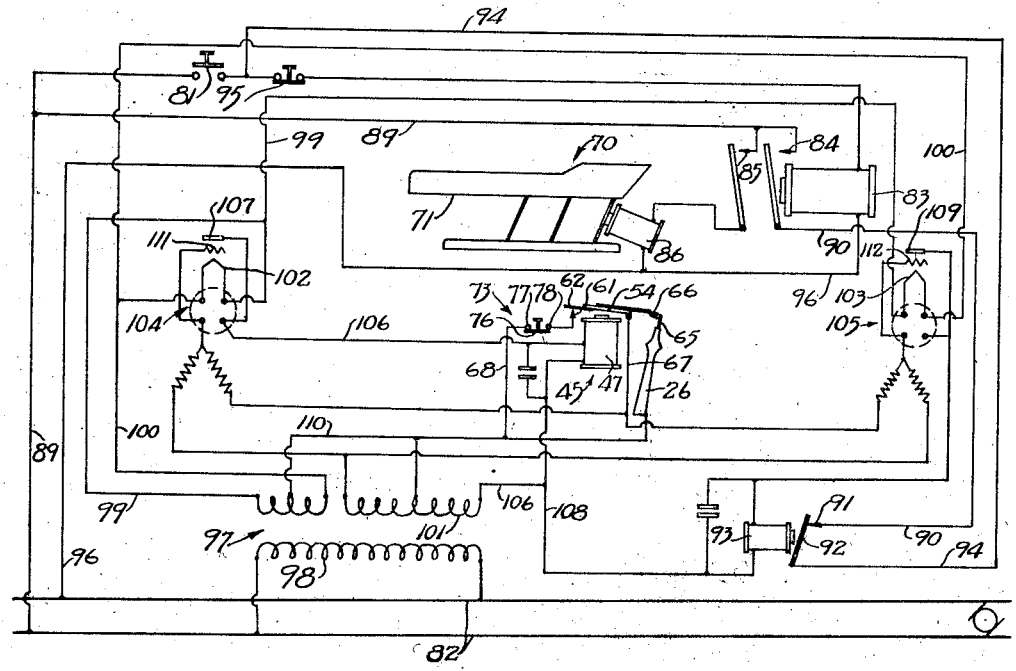
Fig. VII
Lawrence S. Williams
INVENTOR
BY [signature] Marshall
ATTORNEY Patented July 15, 1941

2,249,369

UNITED STATES PATENT OFFICE 2,249,369

WEIGHING SCALE

Lawrence S. Williams, Toledo, Ohio, assignor to Toledo Scale Company, Toledo, Ohio, a corporation of New Jersey Application December 2, 1936, Serial No. 113,775

3 Claims. (Cl. 200—56)

This invention relates generally to weighing scales, and more particularly to scales which are adapted to automatically "cut-off" a stream of material when an exact predetermined amount has been delivered to the weighing scale by auxiliary means.

The prime object of my invention is the provision of improved means in a scale for controlling auxiliary mechanism.

Another object of the invention is the provision of a mechanical scale switch which exerts no reactive influence on the weighing mechanism at the moment of equilibrium.

Another object of the invention is the provision of a mechanical scale switch which is adapted to be momentarily engaged by a moving part of the scale and then to instantaneously move out of the path of such scale part.

Still another object is the provision of improved means whereby a scale switch for controlling auxiliary mechanism may be manually set to intercept a moving scale part at a pre-selected point.

A further object is the provision of improved means for controlling a stream of material.

These, and other objects and advantages will be apparent from the following description in which reference is had to the accompanying drawings, wherein similar reference numerals refer to similar parts throughout the several views.

Referring to the drawings—

Fig. I is a perspective view of a device embodying the invention.

Fig. II is an enlarged fragmentary view showing the manually set control switch and the automatically actuated indicator.

Fig. III is a sectional side elevation thereof, sectioned substantially on the line III—III of Fig. II.

Fig. IV is a still further enlarged fragmentary view of the switch arm in section, showing particularly its mounting means.

Fig. V is an enlarged sectional view of the control switch, the section being along the line V—V of Fig. III.

Fig. VI is an enlarged fragmentary front elevational view of a portion of the scale casings and mechanisms housed therein, showing particularly the de-energizing switch; and, Fig. VII is a diagram of the electrical circuits.

Referring to the drawings in detail:

The scale which is illustrated in Fig. I and embodying the invention is fully described and illustrated in U. S. Patent 1,543,768 to H. O. Hem and for that reason it is described herein only so far as is necessary to properly disclose this invention.

A base 1, in the usual manner, supports lever mechanism (not shown) on which the usual load receiving platform 2 is mounted. For ease of transporting the scale, wheels 3 are provided. A connecting rod 4 (Fig. VI), having a suitable stirrup at its lower end, engages a nose pivot of the load supporting lever mechanism and serves to transmit the "pull" of a load to a tare beam lever 5 fulcrumed in the interior of a column 6. In the customary manner the connection between the upper end of the connecting rod 4 and the tare beam lever 5 is made through a stirrup 7, suspended from a load pivot 8 which projects laterally from the lever 5. A power pivot 9, fixed in the lever 5 in spaced relation to the pivot 8, engages a stirrup 10 suspended from the lower end of a short connecting rod 11. The upper end of this rod is fixed to a yoke-like member 12, to which the lower ends of metallic ribbons 13 are fastened. The upper ends of these ribbons overlie and are fastened to faces of a pair of power sectors 14 which form component parts of load counterbalancing pendulums 15. These pendulums comprise, in addition to the aforementioned power sectors 14, fulcrum sectors 16 and bodies 17. The bodies 17 have studded into depending portions stems 18 on which pendulum weights 19 are adjustably positioned. The metallic ribbons 20, fastened to the arcuate faces of the fulcrum sectors 16, have their upper ends secured to a frame 21 which is perpendicularly mounted in the hollow interior of a substantially watchcase-shaped casing 22 which surmounts the column 6. For the purpose of indicating the weight of loads the pendulums 15 are connected by horizontal bars 23 to which a rack is fastened, the teeth of this rack engage the teeth of a pinion mounted on a shaft 24 rotatably mounted in suitable ball bearings 25 (see Fig. III) which are fixed in the frame 21. Since the extent of the upward movement of the pendulums 15 is always in direct proportion to the amount of load on the platform 2, an indicator 26 clamped to the end of the pinion shaft 24, serves to indicate the weight of the load with the aid of indicia 27, printed on a chart 28 bolted to the faces of inwardly projecting bosses 29 in the housing 22.

For the purpose of counterbalancing tare weights of containers, etc., the tare beam lever 5, which extends through openings in the column 6, is provided at both ends with forwardly projecting brackets 30 to which beams 31 and 32 are fastened by means of screws 33 and on which poises 34 and 35 respectively are slidably mounted.

The scale thus far described is well adapted to cooperate with the embodiment of my invention which, however, may advantageously be used in combination with other types of scales, the only requisite being that such scales have relatively movable index members and that the movement is proportional to the weight of the load.

As hereinbefore stated, the purpose of this invention is to automatically control auxiliary mechanism in accordance with the weight of a load on the load receiver of the scale. The means for exercising such control comprise an arm 36 (Figures II, III and IV) which is clamped against a shoulder 37 by nut 38 on a shaft 39 rotatably mounted in a bracket 40 extending upwardly from the lower portion of the housing 22. A spring washer 41, located circumjacently on the projecting portion of the shaft 39 and lying between its peened over end and the back of the bracket 40, serves to hold this shaft firmly in position yet permits angular adjustment. Manual adjustment may be effected by means of the hand knob 42 clamped to the forward end of the shaft 39 which projects through an opening 43 in a circular sheet of glass 44 that completely covers the open face of the housing 22.

To provide a convenient means for attaching an electromagnetic control member 45, the tip of the arm 36 is bent over so as to form a shelf 46. On this shelf is mounted an electro-magnet 47 which is insulated therefrom by a dielectric bushing 48 and washer 49 and firmly held in place by a screw 50 (Fig. V) which passes through the bushing 48, the shelf 46, washer 49 and into the core of the magnet 47. A U shaped bracket 51 forms a part of the magnet 47 and integral, upwardly formed tips 52 serve as seats for a pintel 53 on which an armature 54 is mounted. In the control circuit a normally open, make and break switch 55 is fastened to the U shaped bracket 51 by means of screws 56 passing through insulating bushings 57. The blades 58 and 59 are normally separated from each other and from the U shaped bracket 51 by dielectric spacers 60. Contact points 61 are fixed to the switch blades in such a manner that they may engage each other when the tip of the blade 58 is pushed outwardly by an insulating button 62, fixed in a downwardly bent portion of the armature 54. The blades 58 and 59 are preferably made of thin steel ribbons which are adapted to be readily flexed yet, unless pressure is applied, will remain parallel to each other in any position to which the arm 36 may be set. Since for the operation of the device it is necessary that the indicator 26, which is electrically energized through the scale, momentarily contact the electromagnetic control member 45 which is set forwardly, out of the path of the indicator 26, the armature 54 has a thin metallic contact member 63 riveted thereto. This contact member 63 has a right angle extension 64 extending into the path of movement of the indicator 26 which is provided with a pin-like projection 65. So that the engagement between the pin-like projection 65 and the extension 64 of the armature 54 be of as short duration as possible the extension 64 has formed therein a semicylindrical portion 66. Current is supplied to the blades 58 and 59 through leads 67' and 68' respectively. The tips of the leads are firmly attached to the blades by soldering. Since the arm 36, to which the switch blades 58 and 59 are attached is rotatable, provision must be made so that the leads 67' and 68' as well as leads 106 and 108 (which will later be more particularly described) whose other ends are fixed, must partake of this rotation. The hub of the arm 36 and a flanged conically stamped member 69 riveted thereto forms a spool on which the leads 58 and 59 and leads 106 and 108 are wound in such a manner so that when the arm 36 is in coincidence with the zero indication of the chart the coils are substantially tightly wound and are gradually unwound as the arm is moved from the zero to the full capacity indicium.

In this embodiment of the invention the control member controls a vibratory feeding device 70 (Figures I and VII), which in itself is well known in the art. This device is entirely independent of the weighing mechanism and may be supported and positioned in any suitable manner, provided that the discharge end of the chute 71 is adapted to deliver the material flowing over it, into a receptacle supported on the load receiver of the scale.

For a purpose, which will be more fully explained, a switch 73 is threaded through an opening in a shoulder 72 of the column 6. This switch 73 comprises a body 74, preferably molded from a synthetic resin having dielectric properties. In a bore, which extends longitudinally through the body, a stem 75 is located for sliding movement. The upper end of the stem has riveted thereto a metallic member 76 adapted to bridge a gap formed by contact members 77 and 78 fixed to bosses in a bow-shaped portion 79 of the switch body 74. Upstanding portions of the contact members 77 and 78 are adapted to enter the contact slots of a standard cord connector 80, whose leads 67 and 68 form a part of the electric control circuit (see Fig. VII).

To determine automatically a pre-selected amount of load, by means of the device hereinbefore described, the first step consists in setting the cutoff switch 45 by rotating the arm 36 about its fulcrum, to a position in which the pin 65, inserted in the tip of the indicator 26, just contacts the semicylindrical depression 66 in the extension of the contact member 63 when the indicator is in registry with that indicia, in the series 27 on the chart 28, which designates the amount desired.

It has been found that the proper position is most readily obtained empirically, that is by trial.

Pressure on push button 81 (see Fig. VII) causes current from a power line 82 to flow through windings of relay 83 closing contacts 84 and 85. Current now flows through contact 85 and windings of a reciprocating motor 86 of the vibratory feeder 70. This causes material, delivered to it by a spout 87 of a supply hopper 88, to flow over it into a receptacle standing on the scale platform 2 in the well known manner. The energization of the vibratory motor 86 is maintained when the pressure on push button 81 is removed, by current flowing through a circuit comprising lead 89 connected to the power line 82, the contact 84 of an armature of relay 83, a lead 90 and contact 91 of an armature 92 of normally open relay 93 and lead 94 through emergency stop switch 95, the winding of relay 83 and lead 96 which connects to the other half of power line 82.

Pressure on the push button 81 also energizes a control circuit. This control circuit includes a transformer 97, whose primary winding 98 is connected to the power line 82. Leads 99 and 100 are tapped to the secondary winding 101 which energizes the filaments 102 and 103 of thermionic tubes 104 and 105 respectively. Lead 106 supplies current to a plate 107 of tube 104 through the winding of the coil 47 and a similar lead 108 supplies current to the plate 109 of tube 105 through the winding of coil 93. The tubes 104 and 105 are normally maintained inoperative except when energized by means of a circuit comprising lead 110 which is connected to the scale indicator 26. In the embodiment of the invention the function of lead 110 is performed by the casing 22. When a load is placed on the platform 2 of the scale the weight moment set up thereby is transmitted by the connecting rod 4 to the tare beam lever 5 and thence, through the short connecting rod 11 which engages the tare beam lever 5, to the pendulum 15. These swing outwardly and upwardly until their weight moment balances the load on the platform. At this time the pin 65 on the indicator 26 just touches the semicylindrical portion 66 which is fastened to the armature 54 of the relay 47, thus completing the circuit to the grids 111 and 112 of the tubes 104 and 105 respectively and thus shifting the potentials of the grids towards the cathode (+) potential, thus inducing the flow of current in the plate circuit of tubes 104 and 105 whereupon relays 47 and 93 are energized pulling in their armatures 54 and 92 respectively. The armature 54 of relay 47 makes a contact 61, parallel to the contact 65 of the indicator 26 and the contact 66 of the armature 54, before the contact 65 of the indicator 26 and the armature 54 breaks. The contact 61 closes the circuit, which is parallel with the indicator armature contact 66, and thus maintains the energization of the tubes until the contact 76 of switch 73, in series with contact 61, has been opened by the return of the tare beam lever 5 to its zero position. The opening of this switch 73 is effected when the tare beam lever 5 engages the end of the stem 75, which is slidingly mounted in the body 74, by raising the metallic member 76 riveted to the stem, thus breaking the bridge between the contacts 77 and 78. This immediately de-energizes tubes 104 and 105 and the relays return to their starting position.

When the relay 93 is energized by the functions described the armature 92 is retracted opening the contact 91 thus de-energizing relay 83, the armatures of this relay open and de-energize the reciprocating motor 86 of the vibratory feeder 70, thus stopping further flow of the material.

Immediately when the relay 47 is energized by a momentary engagement of the pin 65 and the semicylindrical portion 66, this portion is instantaneously moved out of the path of the indicator 26. Thus the entire scale is free to oscillate and the switch 45 exerts no influence on the weighing mechanism.

From the foregoing it is evident that the embodiment of the invention is well adapted to fulfill all the objects primarily stated, it is to be understood however, that it is susceptible to variation, modification and change within the spirit and scope of the subjoined claims.

Having described my invention, I claim:

1. In a device of the class described, in combination, a condition responsive element movable along a predetermined path, an electric circuit controller, said electric circuit controller having a member projecting into the path of said element, an electric circuit adapted to be closed by engagement of said element with said member, and means activated by the closing of said circuit to instantly disengage said member and said element and withdraw said member from the path of movement of said element.

2. In a device of the class described, in combination, a condition responsive element movable along a predetermined path, an electric circuit, a switch controlling said electric circuit, said switch having a member projecting into the path of movement of said element, and means for instantly withdrawing said member from the path of said element upon engagement of said element with said member.

3. In a device of the class described, in combination, a condition responsive element movable along a predetermined path, a member projecting into the path of movement of said movable element, power operated means for withdrawing said member from the path of said movable element, and means operated by engagement of said element and said member to activate said power operated means and thereby instantly to cause disengagement of said member from said element and withdraw said member from the path of movement of said element.

LAWRENCE S. WILLIAMS.